United States Patent
Platto et al.

(10) Patent No.: US 9,469,155 B2
(45) Date of Patent: Oct. 18, 2016

(54) WHEEL OPENING CLOSURE SYSTEM

(71) Applicant: Ford Global Technologies, LLC, Dearborn, MI (US)

(72) Inventors: Gordon M. Platto, Troy, MI (US); David Michael Lechkun, Shelby Township, MI (US); Anthony Lee Meyer, Dearborn, MI (US); Brad Alan Richards, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 814 days.

(21) Appl. No.: 13/724,205

(22) Filed: Dec. 21, 2012

(65) Prior Publication Data
US 2014/0175858 A1    Jun. 26, 2014

(51) Int. Cl.
*B60B 7/00* (2006.01)
*B60B 7/04* (2006.01)
*B60B 7/20* (2006.01)

(52) U.S. Cl.
CPC . *B60B 7/00* (2013.01); *B60B 7/04* (2013.01); *B60B 7/20* (2013.01); *B60B 2900/513* (2013.01)

(58) Field of Classification Search
CPC ............. B60B 7/00; B60B 7/20; B60B 7/04; B60B 2900/513
USPC ............ 301/37.101, 37.103, 37.104, 37.106, 301/37.107
See application file for complete search history.

(56) References Cited

U.S. PATENT DOCUMENTS

| | | | | |
|---|---|---|---|---|
| 5,435,630 | A * | 7/1995 | Tucker | B60B 7/00 301/37.103 |
| 6,485,106 | B1 * | 11/2002 | Hermansen | B05B 15/0487 301/37.103 |
| 6,905,177 | B1 * | 6/2005 | Murillo | B60B 7/06 118/504 |
| 7,448,694 | B1 * | 11/2008 | Bentley | B60B 7/04 118/504 |
| 7,784,877 | B1 * | 8/2010 | Castillo | B60B 7/04 301/37.104 |
| 7,806,484 | B1 | 10/2010 | Young | |
| 7,997,662 | B1 * | 8/2011 | Babineaux, Sr. | B05B 15/0487 118/505 |
| 8,556,351 | B1 * | 10/2013 | Uhlin | B60B 7/04 301/37.104 |

FOREIGN PATENT DOCUMENTS

EP    2050661 B1    1/2010

\* cited by examiner

*Primary Examiner* — S. Joseph Morano
*Assistant Examiner* — Jean Charleston
(74) *Attorney, Agent, or Firm* — Frank MacKenzie; Brooks Kushman P.C.

(57) ABSTRACT

A vehicle is provided with a hub and a collar. The hub extends longitudinally inward from a wheel. The collar is disposed over the hub and is mounted for translation relative to the hub. The vehicle also includes a panel assembly having a support and first and second panels. The support extends radially outward from the collar, and the first and second panels are each pivotally connected to opposing lateral edges of the support. The panels pivot between an expanded position and a collapsed position and translate radially for selectively closing a wheel opening.

19 Claims, 10 Drawing Sheets

US 9,469,155 B2

1

WHEEL OPENING CLOSURE SYSTEM

TECHNICAL FIELD

One or more embodiments relate to a system for adjusting air flow through a wheel opening.

BACKGROUND

Conventional vehicles utilize friction for decelerating ("braking") the vehicle. Such vehicles typically include a rotor that rotates with a wheel, that is subjected to a frictional force for braking the vehicle. The frictional force results in elevated temperatures of the rotor and the element generating the frictional force (e.g., brake pads). Vehicle wheels typically include wheel openings for allowing air to flow through the wheel and about the rotor for facilitating heat transfer.

Vehicles in motion are subjected to aerodynamic forces including upward forces ("lift") and air resistance ("drag"). The shape of external vehicle surfaces affect lift and drag. For example, wheel openings may affect the drag acting upon the vehicle. Drag increases with speed and decreasing drag helps to improve the fuel economy of a vehicle.

SUMMARY

In one embodiment, a vehicle is provided with a hub and a collar. The hub extends longitudinally inward from a wheel. The collar is disposed over the hub and is mounted for translation relative to the hub. The vehicle also includes a panel assembly having a support and first and second panels. The support extends radially outward from the collar, and the first and second panels are each pivotally connected to opposing lateral edges of the support. The panels pivot between an expanded position and a collapsed position and translate radially for selectively closing a wheel opening.

In another embodiment, a system is provided with a hub that extends inward from a wheel. A sleeve is disposed over the hub and has an angled slot formed therein. A panel extends radially outward from the sleeve. A disc is mounted for rotation about the hub in response to an input force. The disc has a flange that is adapted to engage the angled slot for converting rotational motion to translational motion of the sleeve and panel for opening/closing a wheel opening.

In yet another embodiment, a system is provided with a hub extending inward from a wheel and a sleeve disposed over the hub. A support extends radially outward from the sleeve with a panel pivotally connected thereto. A ring is mounted for rotation about the sleeve in response to an input force. A projection extends radially outward from the ring for engaging the panel for converting rotational motion to pivotal motion of the panel for opening/closing a wheel opening.

2

Figure 1:
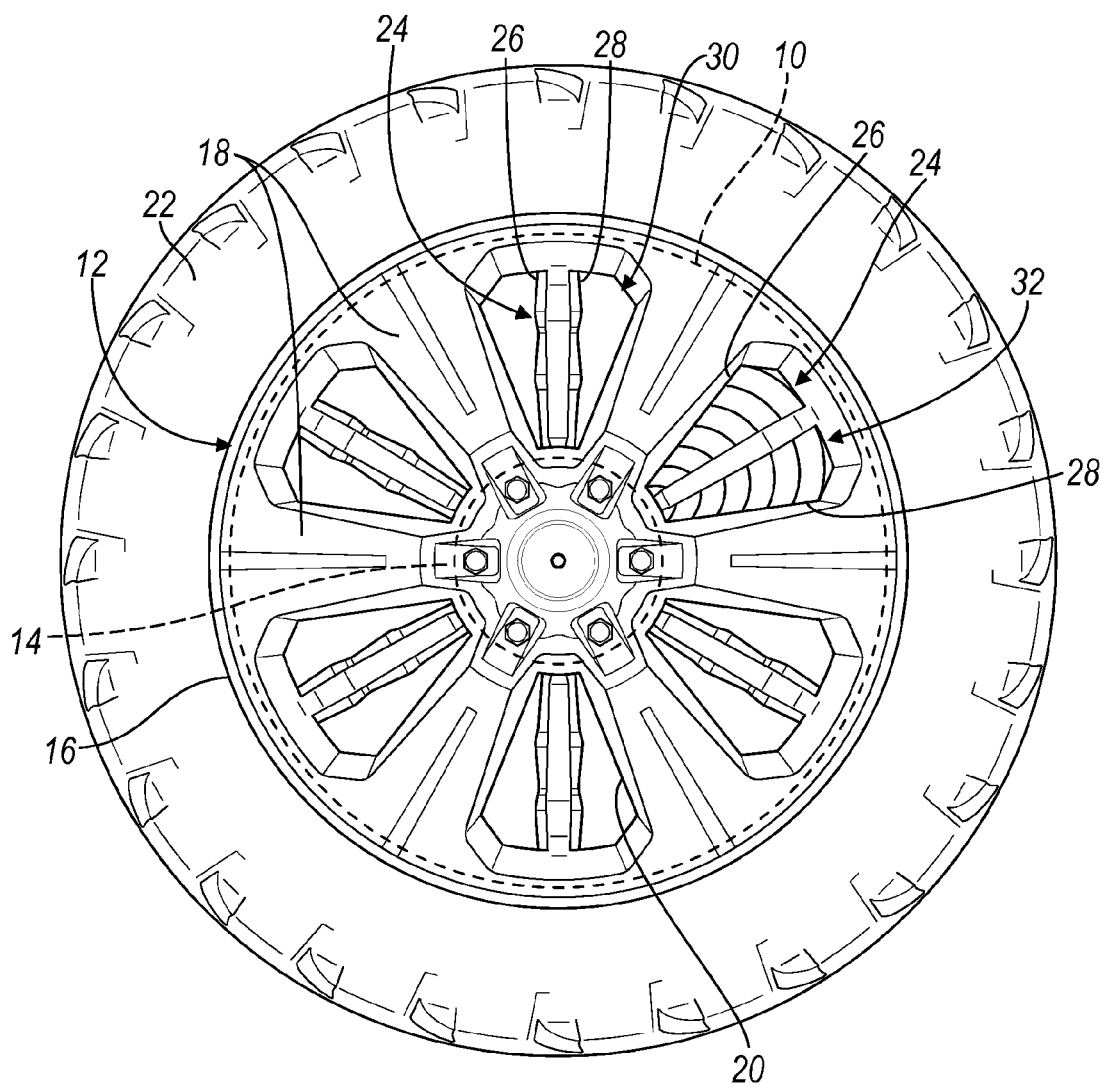
FIG. 1 is a front view of a wheel and a wheel system for selectively closing wheel openings, according to one or more embodiments.
Figure 5:
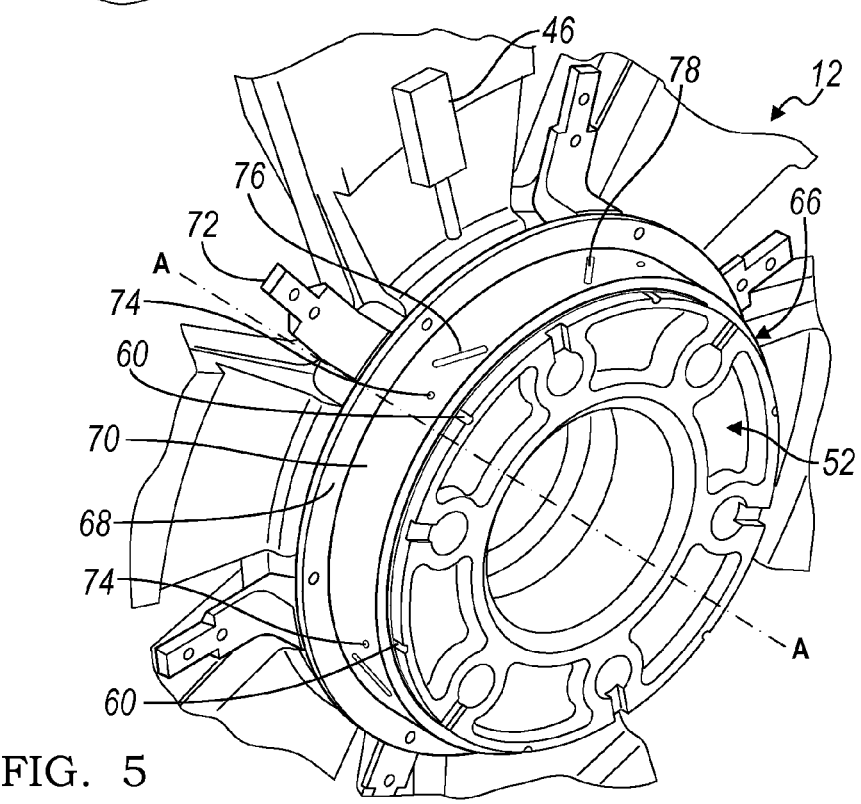
Figure 6:
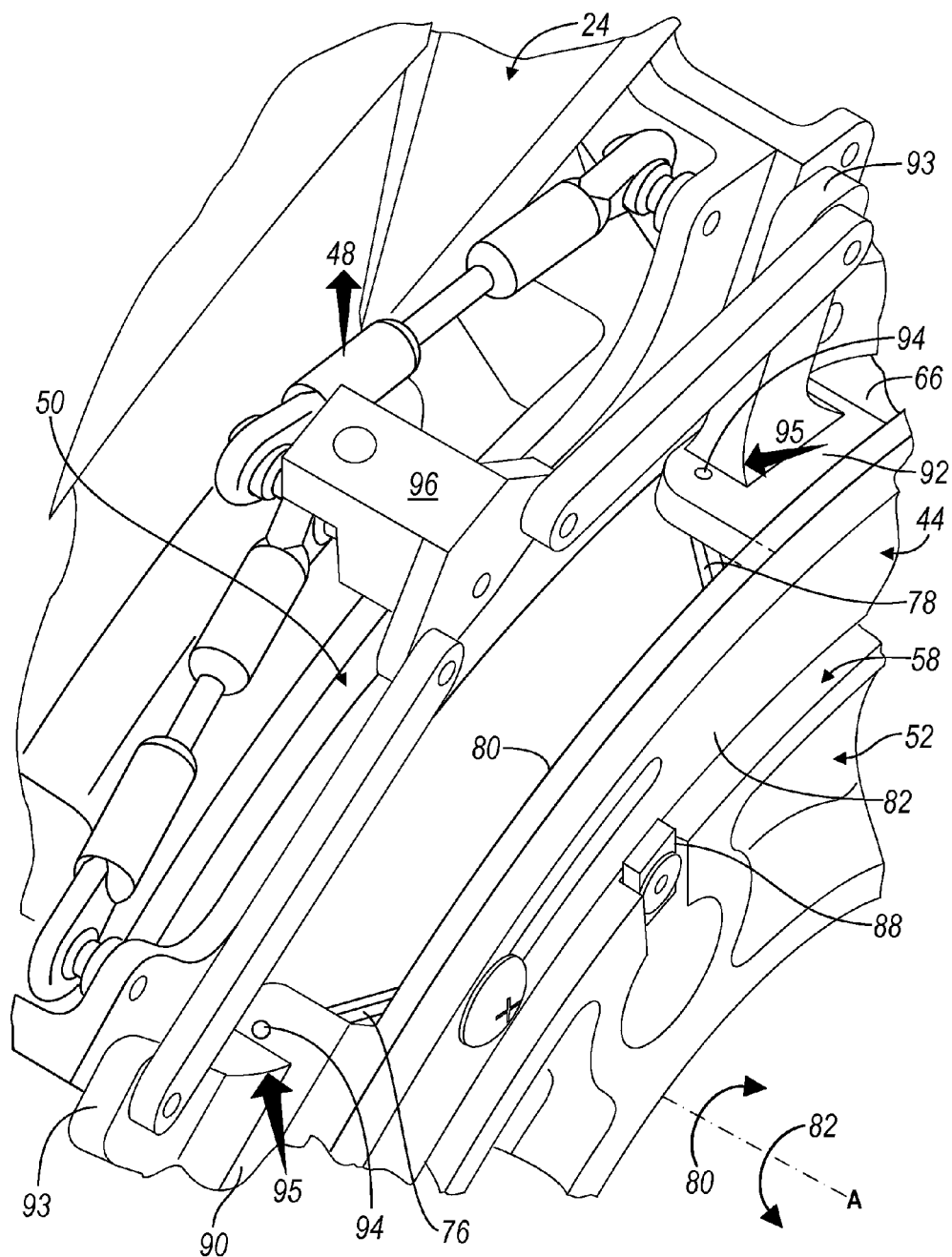
Figure 7:
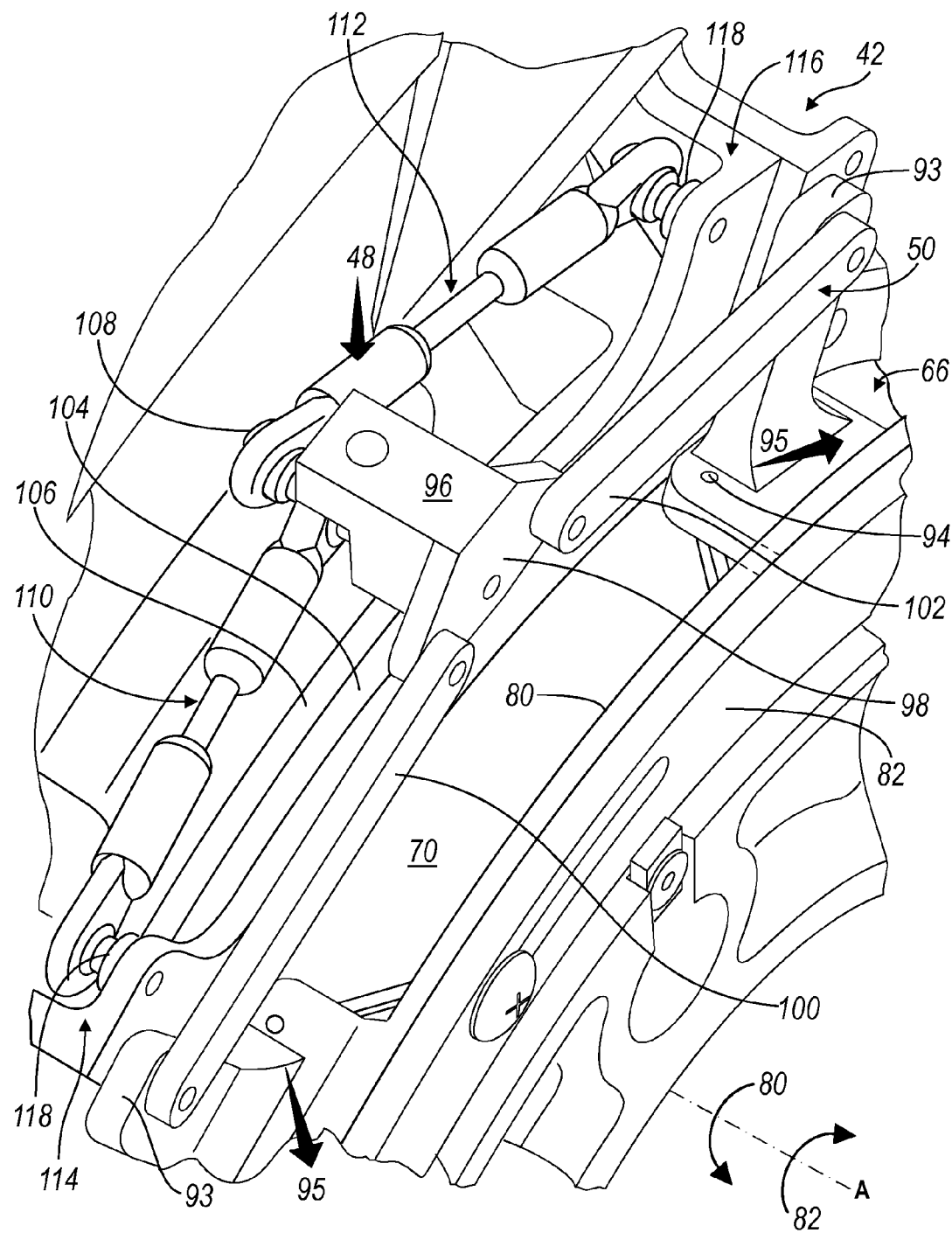
Figure 8:
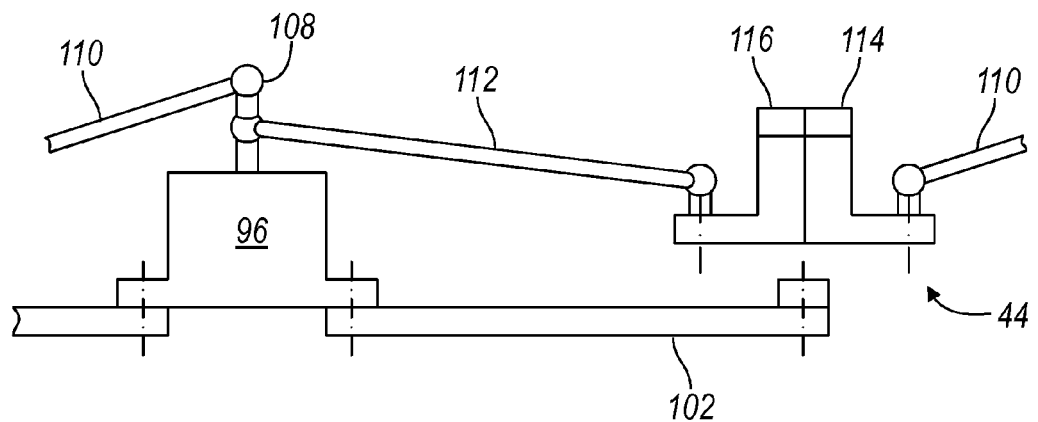
Figure 9:
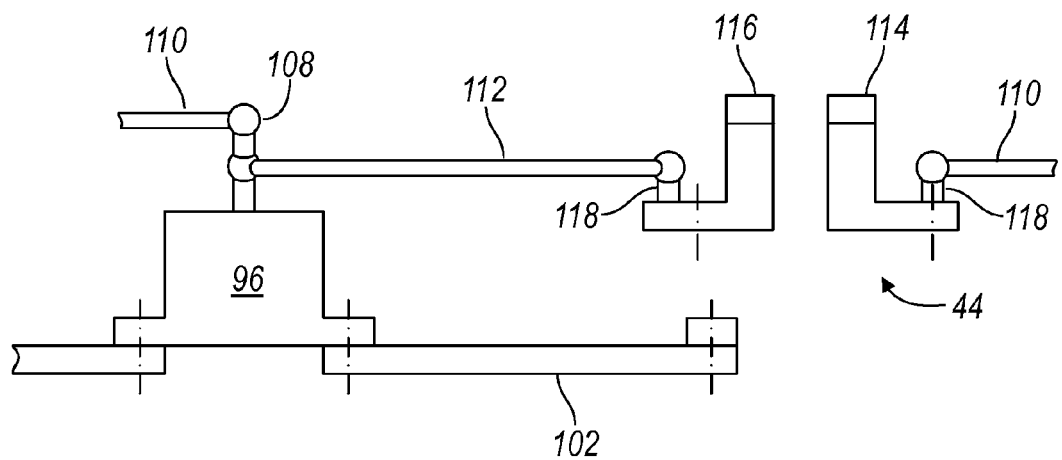
Figure 10:
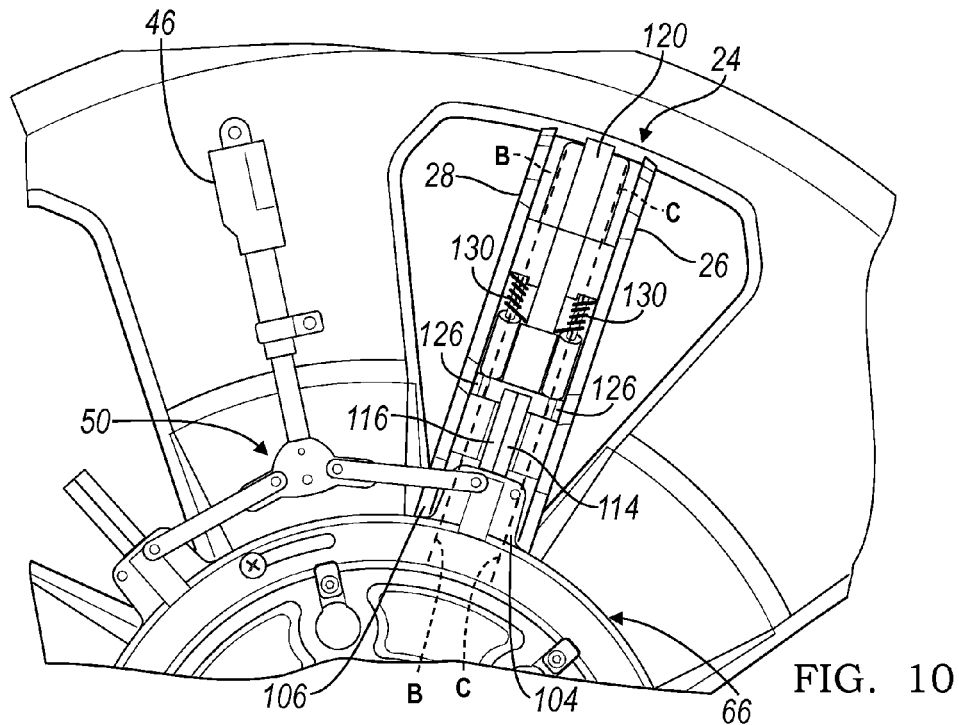
Figure 11:
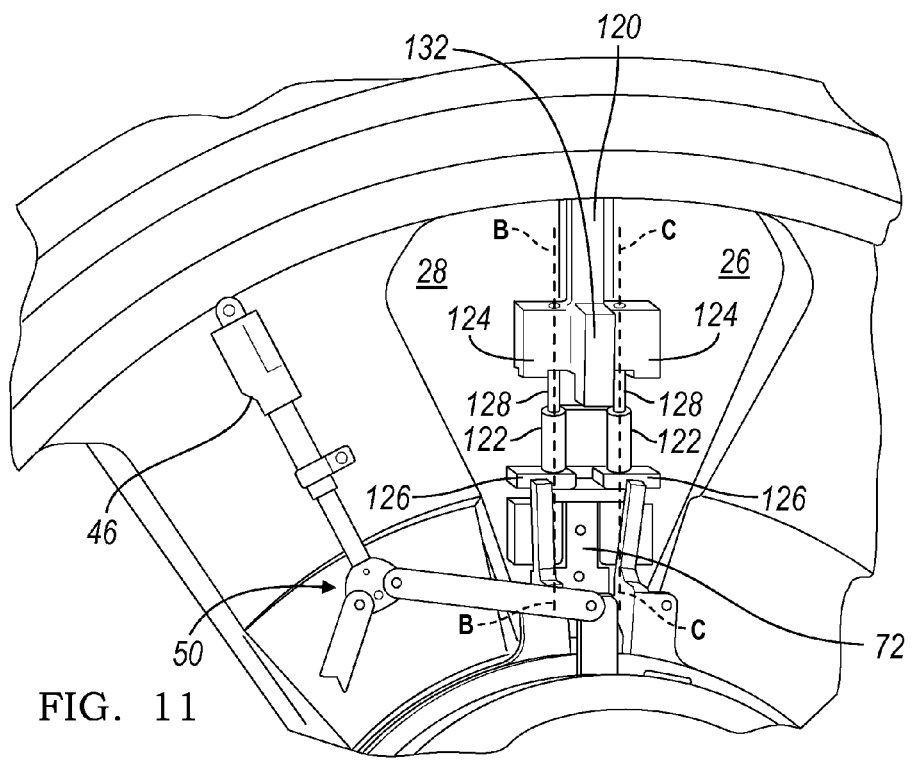
Figure 12:
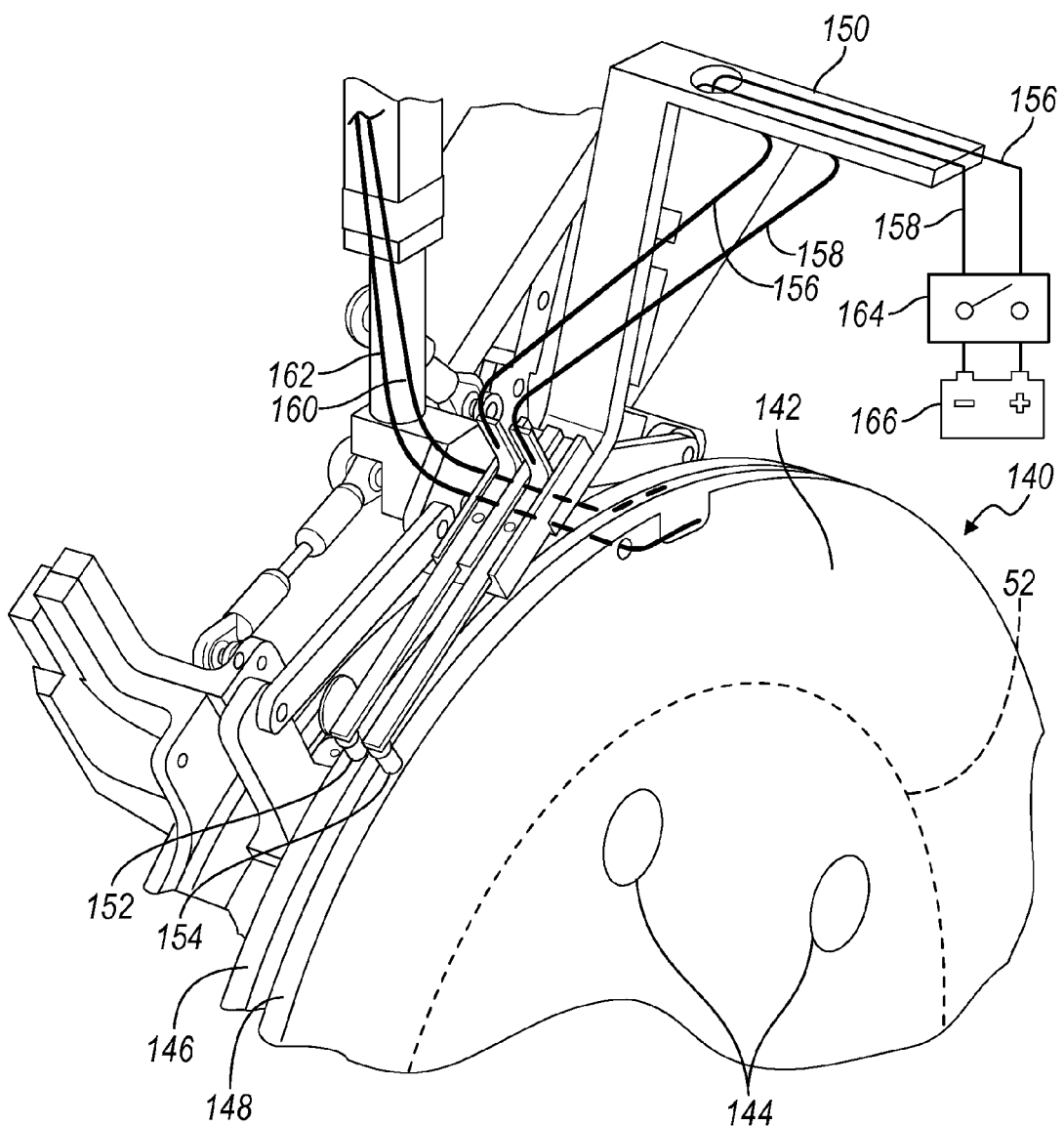
Figure 13:
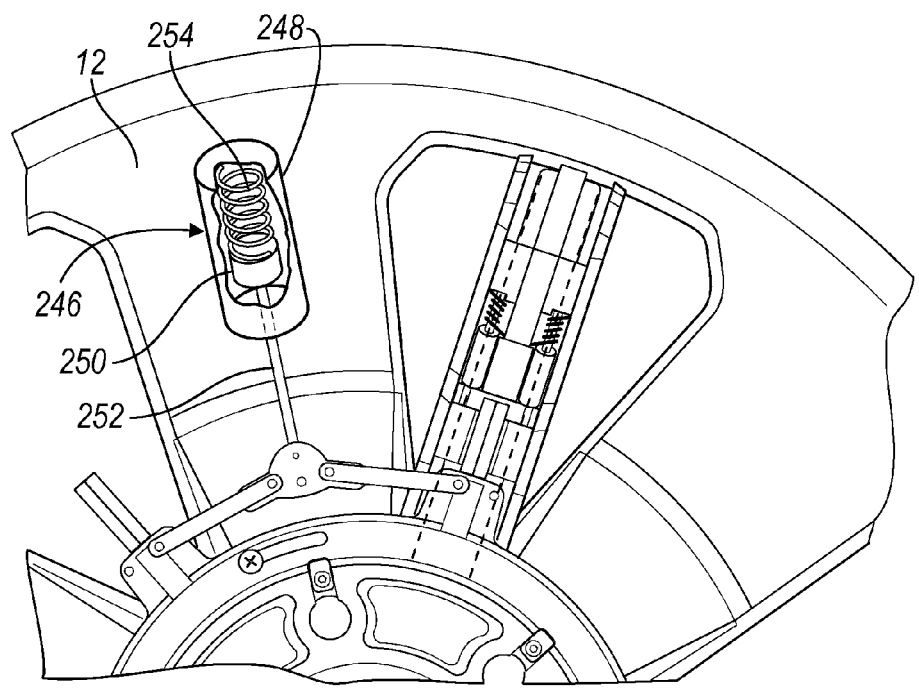
Figure 14:
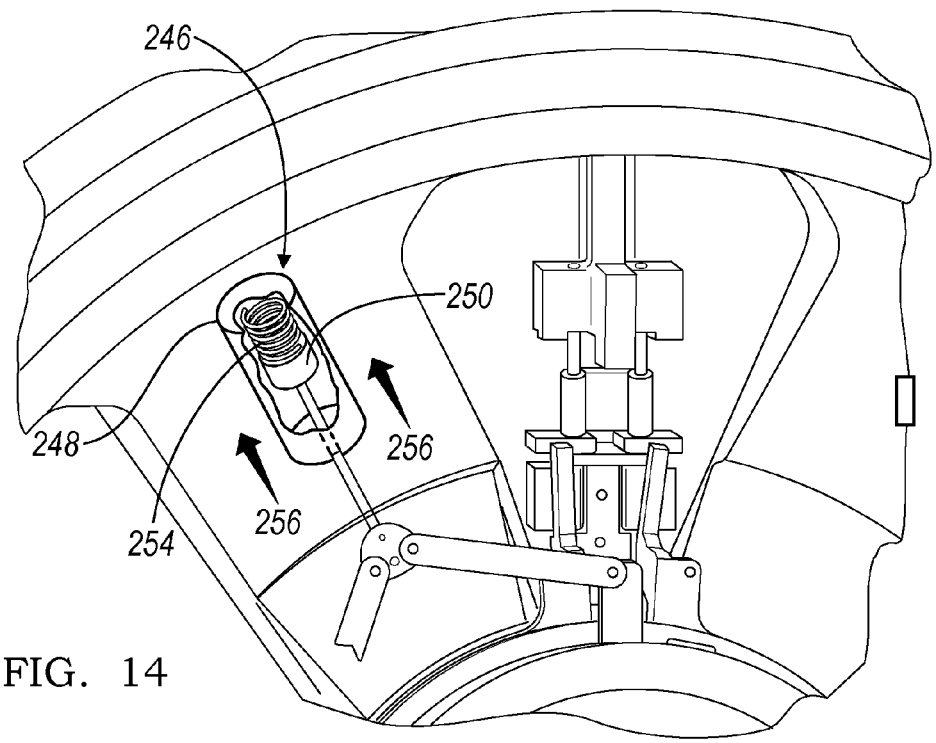

FIG. 5 is another enlarged rear perspective view of a portion of the wheel of FIG. 1, illustrating a collar and the hub of the wheel system;

FIG. 6 is an enlarged top perspective view of the wheel system of FIG. 1, illustrating forces acting upon the wheel system for adjusting from an open position to a closed position;

FIG. 7 is an enlarged rear perspective view of the wheel system of FIG. 1, illustrating forces acting upon the wheel system for adjusting from a closed position to an open position;

FIG. 8 is an enlarged top schematic view of the wheel system of FIG. 1, illustrating a pivot adjustment mechanism in the open position;

FIG. 9 is an enlarged top schematic view of the wheel system of FIG. 1, illustrating the pivot adjustment mechanism in the closed position;

FIG. 10 is an enlarged rear view of the wheel system of FIG. 1, illustrating a panel assembly oriented in the open position with collapsed panels;

FIG. 11 is an enlarged rear view of the wheel system of FIG. 1, illustrating the panel assembly oriented in the closed position with expanded panels;

FIG. 12 is an enlarged top view of a slip ring assembly for supplying electrical power to an actuator of the wheel system of FIG. 1, according to one or more embodiments;

FIG. 13 is an enlarged rear view of a wheel system for selectively closing wheel openings, according to one or more embodiments, and illustrated with a mechanical actuator and a panel assembly oriented in the open position with collapsed panels; and FIG. 14 is another enlarged rear view of the wheel system of FIG. 13, illustrating the panel assembly oriented in the closed position with expanded panels.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIG. 1, a wheel system for selectively closing wheel openings is illustrated in accordance with one or more embodiments and generally referenced by numeral 10. The wheel system 10 is mounted to an inner portion of a wheel 12 of a vehicle (not shown).

The wheel 12 includes a central hub 14 and a rim 16 that are centered about a longitudinal axis ("A"). A series of spokes 18 extend radially between the central hub 14 and the rim 16. The series of spokes 18 are angularly spaced apart from each other to define a wheel opening 20 between each pair of adjacent spokes 18. A tire 22 is coupled to the rim 16 and extends around a circumference of the wheel 12.

The wheel system 10 includes a series of panel assemblies 24 that are each aligned with one of the wheel openings 20. Each panel assembly 24 includes a first panel 26 and a second panel 28 along with an adjustment mechanism for controlling pivotal movement of each panel 26, 28 between an open position 30 and a closed position 32. The panels 26, 28 are collapsed when oriented in the open position 30 to allow air to flow through the wheel openings 20. The panels 26, 28 are expanded when oriented in the closed position 32, to restrict or prevent air flow through the wheel openings 20. Although the panel assemblies 24 are shown in both a collapsed/open position 30 and an expanded/closed 32 positions in FIG. 1, the wheel system 10 is configured to adjust the panel assemblies 24 together (e.g., all open or all closed) according to one or more embodiments.

The wheel system 10 also includes an adjustment mechanism for controlling translation of the panel assemblies 24 along the longitudinal axis A between the open position 30 and the closed position 32. When oriented in the collapsed/open position 30, the panel assemblies 24 are longitudinally spaced inward from the wheel 12 and allow air to flow through the wheel openings 20. When oriented in the expanded/closed position 32, the panel assemblies 24 are longitudinally spaced adjacent to the wheel 12 and restrict air flow through the wheel openings 20.

Figure 2:
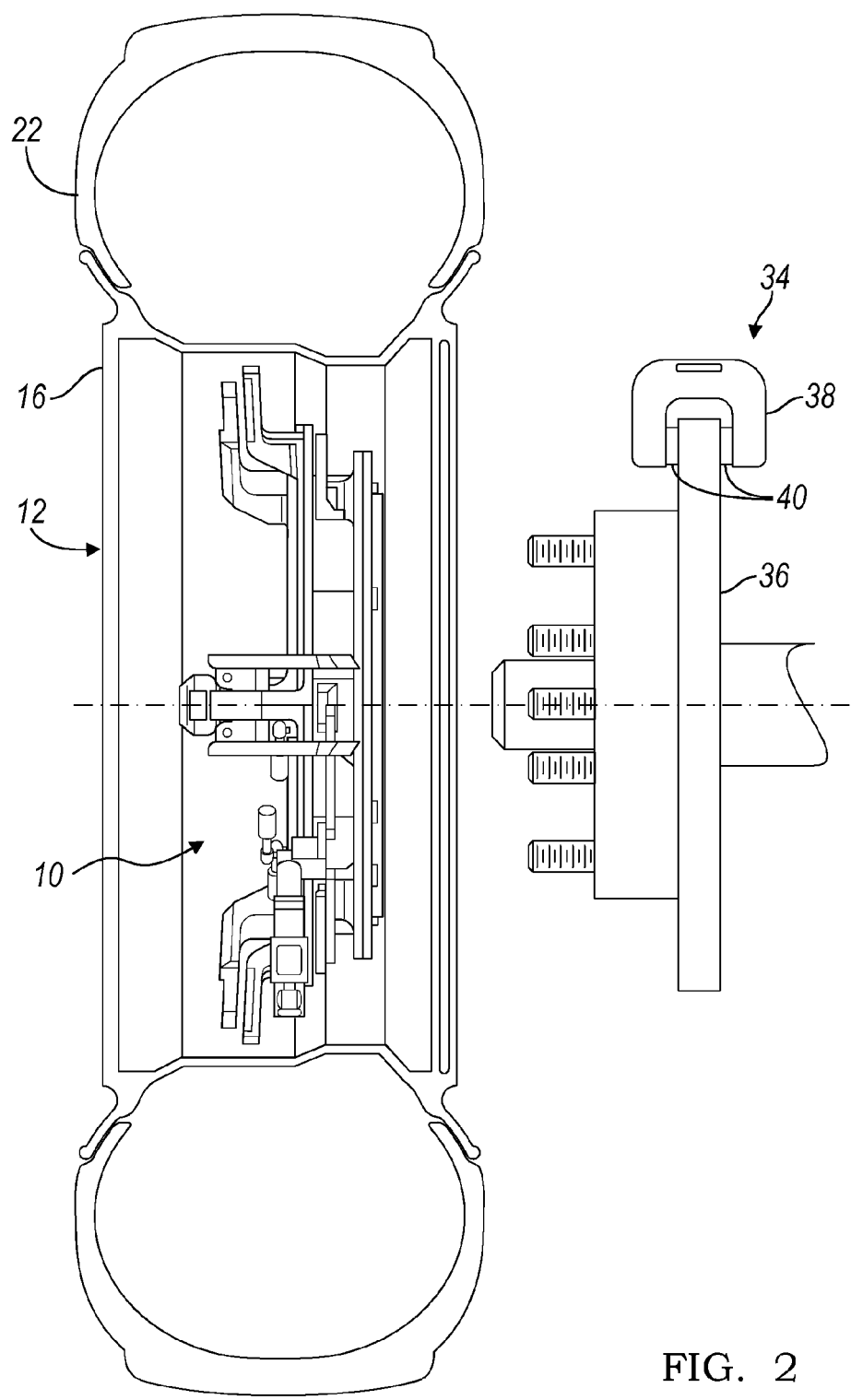
FIG. 2 is a side partial section view of the wheel and the wheel system of FIG. 1, illustrated with a brake assembly.

FIG. 2 illustrates the wheel system 10 mounted to the wheel 12 and adjacent to a brake assembly 34. The vehicle (not shown) utilizes friction for braking. The brake assembly 34 includes a rotor 36 that rotates with the wheel 12. The brake assembly 34 also includes a caliper 38 with brake pads 40. The caliper 38 applies a clamp force to the brake pads 40 which contact the rotor 36 and provides a frictional force for braking the vehicle. The frictional force results in elevated temperatures of the rotor 36 and the brake pads 40.

Referring to FIGS. 1 and 2, the wheel system 10 controls the adjustment of the panel assemblies 24 based on vehicle operating conditions. The wheel system 10 adjusts the panel assemblies 24 to the collapsed/open position 30 during braking to facilitate heat transfer. The wheel system 10 also adjusts the panel assemblies to the expanded/closed position during high vehicle speeds to reduce drag. Other embodiments of the wheel system 10 contemplate the control of the wheel system 10 based on input from a user or other vehicle systems.

Figure 3:
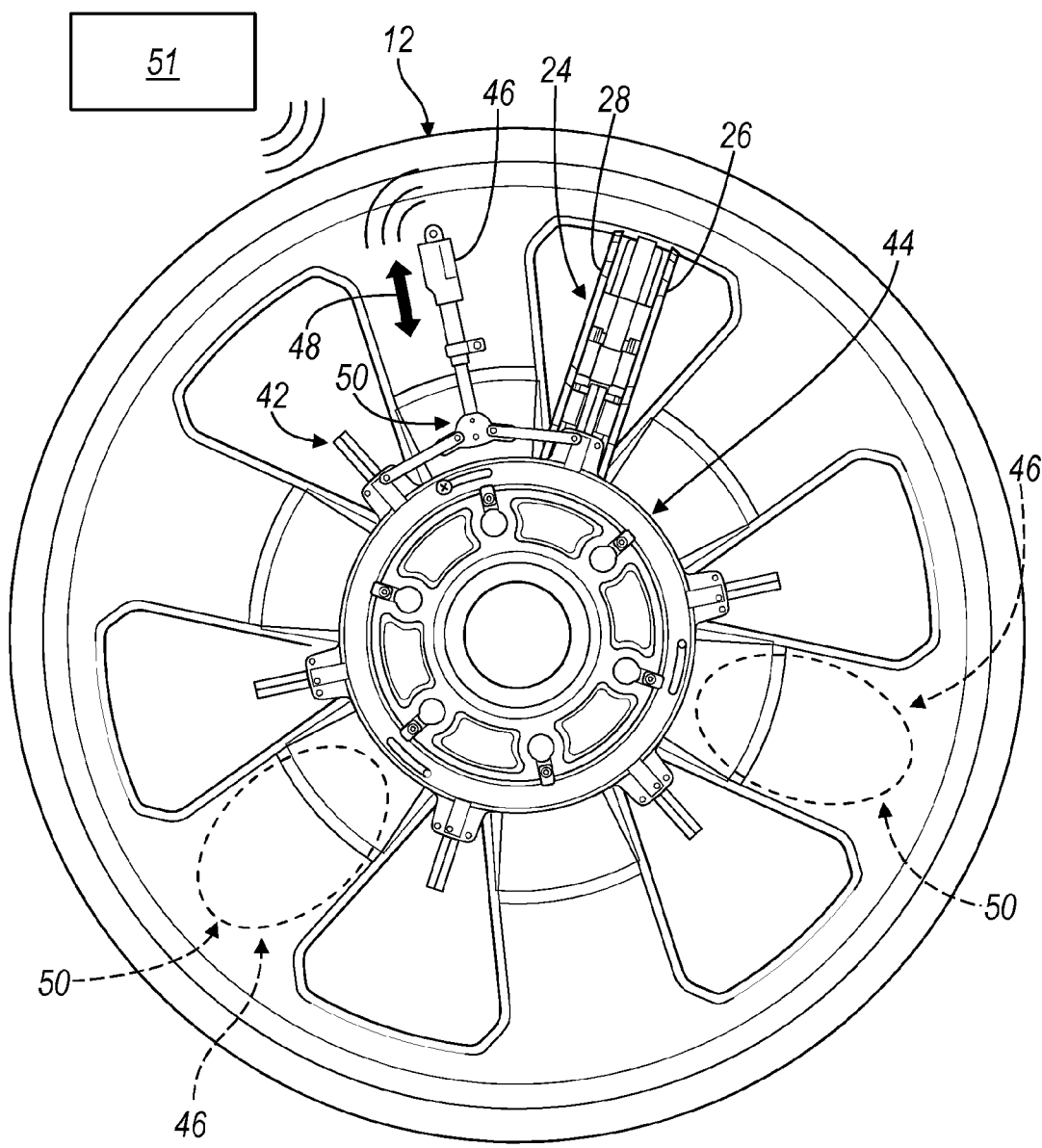
FIG. 3 is a rear view of the wheel and the wheel system of FIG. 1.

With reference to FIG. 3, the wheel system 10 includes a pivot adjustment mechanism 42 for controlling pivotal motion of each panel 26, 28. The wheel system 10 also includes a translation adjustment mechanism 44 for controlling translation of the panel assembly 24. The wheel system 10 also includes an actuator 46 for providing an input force 48 acting radially inward and outward; and a linkage assembly 50 for coupling the actuator 46 to each adjustment mechanism 42, 44.

The wheel system 10 includes a panel assembly 24 corresponding to each wheel opening 20. However for brevity only one panel assembly 24 is shown in FIG. 3. In the illustrated embodiment, the wheel system 10 includes one actuator 46 and one linkage assembly 50 operating the panel assemblies 24. However, other embodiments include two or more actuators and linkage assemblies. For example, in one embodiment, the wheel system 10 includes three actuators 46, and three linkage assemblies 50 that are angularly spaced at 120 degree intervals about the wheel 12, as generally depicted in phantom line in FIG. 3. Such angular spacing helps distribute the mass associated with such components for wheel balancing.

The actuator 46 is a linear actuator having a motor and a leadscrew according to the illustrated embodiment. The wheel system 10 includes a slip-ring assembly (shown in FIG. 12) for providing electrical power to the actuator 46 according to one embodiment. In other embodiments, the actuator includes a battery (not shown) for supplying electrical power. In other embodiments, the actuator 46 is a mechanical device (shown in FIGS. 13 and 14) that actuates in response to centrifugal forces acting on the wheel 12 during rotation. In one or more embodiments, the actuator 46 includes a transceiver for wirelessly communicating with a controller 51 located within the vehicle for receiving instructions as to when to actuate.

Figure 4:
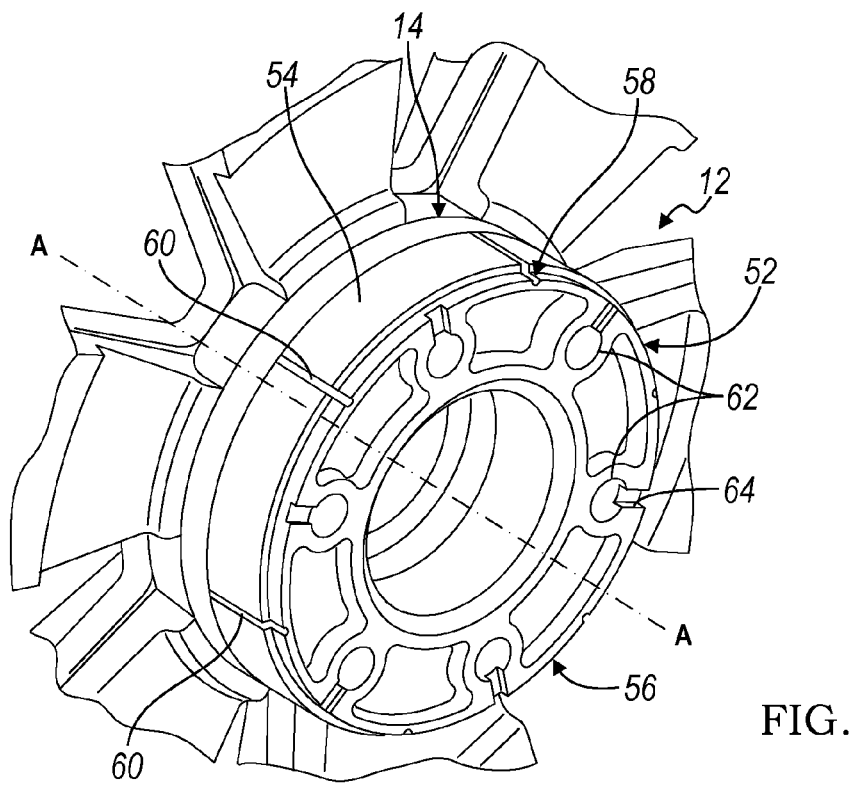
FIG. 4 is an enlarged rear perspective view of a portion of the wheel of FIG. 1, illustrating a hub of the wheel system.

Referring to FIGS. 4 and 5, the wheel system 10 includes a hub 52 that extends longitudinally inward from the central hub 14. The hub 52 has a generally cylindrical shape with a peripheral surface 54 and an inner surface 56 longitudinally spaced apart from the central hub 14. A recess 58 is formed into the peripheral surface 54 about a circumference of the hub 52 and adjacent to the inner surface 56. A series of grooves 60 are also formed into the peripheral surface 54 and extend longitudinally along a length of the hub 52.

An array of apertures 62 project longitudinally through the hub 52. The apertures 62 align with corresponding holes formed through the central hub 14 for receiving bolts (shown in FIG. 2) for mounting the wheel 12 to the vehicle. A series of pockets 64 are formed into the inner surface 56. Each pocket 64 is formed radially outward of one of the apertures 62 and projects through the peripheral surface 54.

The wheel system 10 includes a collar 66 that is disposed over the hub 52 and mounted for translation relative to the hub 52. The collar 66 includes a base 68 with a sleeve 70 extending longitudinally inward from the base 68. A series of panel brackets 72 extend radially outward from the base 68. A panel assembly 24 is mounted to each panel bracket 72 (shown in FIG. 3). A series of projections 74 (e.g., pins) extend radially inward from an inner surface of the sleeve 70. The projections 74 are angularly spaced apart from each other about the sleeve 70. Each projection 74 is sized to engage one of the grooves 60 formed into the hub 52 to provide a key/keyway interface for angularly orienting the collar 66 relative to the hub 52 such that each panel bracket 72 (and panel assembly 24) is centrally aligned with one of the wheel openings 20.

The collar 66 includes a plurality of pairs of angled slots formed through the sleeve 70. Each pair of slots include a first slot 76 and a second slot 78 that are centered relative to an actuator 46. In one embodiment, the collar 66 includes three pairs of angled slots 76, 78 where each pair is angularly spaced apart from each other at 120 degree intervals. The angled slots 76, 78 converge toward each other as they extend away from the base 68. In one embodiment, the angled slots 76, 78 are each oriented at an angle of approximately 45 degrees relative to an imaginary longitudinal line oriented in parallel with the longitudinal axis A.

Referring to FIGS. 6 and 7, the wheel system 10 includes a translation adjustment mechanism 44 for controlling translation of the panel assembly 24 and the collar 66 relative to the hub 52. The translation mechanism 44 includes a first disc 80 and a second disc 82 that are disposed within the recess 58 formed in the hub 52. The discs 80, 82 are configured to rotate about the hub 52 in opposing directions relative to each other 80, 82 in response to the input force 48.

The discs 80, 82 are coupled to each other according to one embodiment. An arcuate slot 84 is formed through the second disc 82 and a threaded hole is formed through the first disc 80. A fastener 86 engages the first disc 80 about the threaded hole and extends through the arcuate slot 84 of the second disc 82 for coupling the discs 80, 82 to each other. The fastener 86 translates within the arcuate slot 84 until it contacts an end of the slot 84 for limiting rotational travel of the discs 80, 82.

The discs 80, 82 are longitudinally constrained within the recess 58. Each disc 80, 82 has an inner diameter that is larger than the diameter of the hub 52 within the recess 58, but less than the diameter of the peripheral surface 54 of the hub 52 longitudinally outward of the recess 58, thereby preventing translation outward. Additionally, retaining clips 88 may be attached to the inner surface 56 of the hub 52 within each pocket 64. The clips 88 extend radially outward from the hub 52 to constrain the discs 80, 82 within the recess 58.

A series of flanges extend longitudinally outward from each disc 80, 82. A series of first flanges 90 extend from the first disc 80 and a series of second flanges 92 extend from the second disc 82. In one embodiment, the first flanges 90 extend from an upper radial portion of the first disc 80 and the second flanges 92 extend from a lower radial portion of the second disc 82 and through openings (not shown) formed through a lower portion of the of the first disc 80, for nesting the discs 80, 82 to each other.

A post 93 extends radially outward from each flange 90, 92. Each post 93 is pivotally coupled to the actuator 46 (shown in FIG. 3) by the linkage assembly 50 for receiving the input force 48.

As illustrated in FIG. 6, the input force 48 is applied in a radially outward direction which results in the first disc 80 rotating in a clockwise direction about the longitudinal axis A, and the second disc 82 rotating in a counter-clockwise direction about the longitudinal axis A.

Each flange 90, 92 engages the sleeve 70 within the corresponding angled slot 76, 78 for converting rotational motion of the disc 80, 82 to translational motion of the collar 66. In one embodiment, a pin 94 extends radially inward from each flange 90, 92 to engage the sleeve 70 within the angled slot 76, 78. The angle of the angled slots 76, 78 results in an angled normal force 95 being applied to the sleeve 70 as a result of the input force 48.

The input force 48 is applied in a radially outward direction in FIG. 6, which results in converging normal forces 95 being applied to the sleeve 70, such that the sleeve 70 translates longitudinally outward. The panel assembly 24 is coupled to the collar 66. Thus the radially outward input force 48 shown in FIG. 6, results in the collar 66 and panel assembly 24 translating longitudinally outward from an open position 30 (shown in FIG. 1) to a closed position 32 (also shown in FIG. 1). Again, although the collar 66 translates longitudinally along the axis A, the discs 80, 82 are longitudinally constrained within the recess 58 and therefore do not translate.

FIG. 7 illustrates the input force 48 being applied in a radially inward direction which results in the first disc 80 rotating in a counter-clockwise direction about the longitudinal axis A, and the second disc 82 rotating in a clockwise direction about the longitudinal axis A. The input force 48 is applied in a radially inward direction in FIG. 7, which results in diverging normal forces 95 being applied to the sleeve 70 to translate the collar 66 in a longitudinally inward direction.

The linkage assembly 50 includes a pivot block 96 that is connected to the corresponding actuator 46 (shown in FIG. 8) for receiving the input force 48. Each pivot block 96 has a plate 98 formed at an inner end. A first link 100 and a second link 102 are each pivotally connected to opposing lateral ends of the plate 98 and extend in opposing lateral directions from each other. The first link 100 is pivotally connected to the post 93 of the first disc 80 and the second link 102 is pivotally connected to the post 93 of the second disc 82, such that first disc 80 and second disc 82 rotate in opposite directions in response to translation of the pivot block 96. The pivot block 96 translates radially relative to the hub 52, however, like the discs 80, 82, the pivot block 96 does not translate longitudinally inward and outward.

The wheel system 10 includes a pivot adjustment mechanism 42 for controlling pivotal motion of each panel assembly 24. The pivot adjustment mechanism 42 includes a first ring 104 and a second ring 106 disposed over the sleeve 70. The rings 104, 106 are mounted for translation with the collar 66. The rings 104, 106 are also configured to rotate about the sleeve 70 in opposing directions relative to each other in response to the input force 48.

With reference to FIGS. 7-9, the pivot adjustment mechanism 42 is pivotally connected to the linkage assembly 50 using ball and socket joints, according to one or more embodiments. The rings 104, 106 translate longitudinally while rotating about the sleeve 70, and ball and socket joint facilitate such translation and rotation. A dual ball joint 108 extends longitudinally outward from the pivot block 96. A first bar 110 and a second bar 112 are each connected to separate balls of the dual ball joint 108. A series of first projections 114 extend radially outward from the first ring 104. A series of second projections 116 extend radially outward from the second ring 106. A ball joint 118 extends from an intermediate portion of each projection 114, 116. The first bar 110 pivotally connects to the first ring 104 at the ball joint 118, and the second bar 112 pivotally connects to the second ring 106 at the corresponding ball joint 118 for coupling the input force 48 to the rings 104, 106.

FIGS. 8 and 9 are top schematic views of the linkage assembly 50 and the pivot adjustment mechanism 42 and depict the translational movement of the rings 104, 106. FIG. 8 depicts the pivot adjustment mechanism 42 in the open position 30 (shown in FIG. 1), and FIG. 9 depicts the pivot adjustment mechanism 42 in the closed position 32 (also shown in FIG. 1).

With reference to FIGS. 10 and 11 each panel assembly 24 is supported by the collar 66, and includes a support 120 that extends radially outward from the panel bracket 72. The first panel 26 and the second panel 28 are each pivotally connected to the support 120. In one embodiment, the support 120 includes a pair of guide tubes 122 that are formed at opposing lateral edges and each aligned with a lateral axis ("B" or "C"). The panels 26, 28 each include a block 124 and a rest 126 with apertures formed through. The block 124 and the rest 126 are each disposed on an inner edge of the corresponding panel 26, 28 and spaced apart from each other. A guide tube 122 is oriented between the block 124 and the rest 126 of each panel 26, 28 and aligned along the corresponding axis B or C for receiving a pin 128. The pin 128 extends through the block 124, the guide tube 122 and the rest 126 for connecting the corresponding panel 26, 28 to the support 120. A torsion spring 130 (shown in FIG. 10) is disposed over the pin 128 between the block 124 and the guide tube 122 and biases each panel 26, 28 in the collapsed/open position 30 (shown in FIG. 1). A stop 132 extends longitudinally from an intermediate portion of the support 120. The stop 132 is sized to contact each block 124 when the panel assembly 24 is in the collapsed/open position to limit the pivotal motion of the panels 26, 28.

The pivot adjust mechanism 42 includes the pair of rings 104, 106 each having a series of radially extending projections 114, 116. As shown in FIG. 10, the projections 114, 116 are located adjacent to each other and between a pair of rests 126 when the panel assembly 24 is oriented in a collapsed/open position. As the rings 104, 106 rotate in opposing directions, the distal ends of the projections 114, 116 contact the corresponding rests 126 and expand the panels 26, 28 into the expanded/closed position shown in FIG. 11. The panels 26, 28 are sized to engage the wheel 12 about the opening 20 to restrict air flow.

With reference to FIG. 12, the wheel system 10 includes a slip-ring assembly 140 for providing electrical power to the actuator 46, according to one or more embodiments. A plate 142 is mounted to the hub 52. An array of holes 144 project longitudinally through the plate 142 and are aligned with the apertures 62 of the hub 52 for receiving the bolts (shown in FIG. 2). The plate 142 rotates with the wheel 12 (FIG. 1).

A first conductive ring 146 and a second conductive ring 148 are disposed about a circumference of the plate 142, and longitudinally spaced apart from each other. A stationary bracket 150 extends radially outward from the brake assembly 34 (shown in FIG. 2), and supports a pair of brushes 152, 154. Each brush 152, 154 is biased to contact a corresponding conductive ring 146, 148 as the plate 142 rotates. A pair of stationary wires 156, 158 electrically connect to corresponding brushes 152, 154 and extend along the stationary bracket 150. A pair of rotating wires 160, 162 electrically connect to the actuator 46 and extend to the plate 142. The rotating wires 160, 162 contact corresponding conductive rings 146, 148. The stationary wires 156, 158 extend along the stationary bracket 150 to connect to a switch 164, which is connected to a vehicle battery 166. The switch 164 is configured to switch the polarity of the electrical power supplied by each wire 158, 160 (e.g., between positive battery voltage and ground) for controlling the actuation of the actuator 46 and the resultant input force.

Referring to FIGS. 13 and 14, the wheel system 10 includes a mechanical actuator 246 according to one or more embodiments. The actuator 246 includes a guide 248 that is mounted to the wheel 12 and radially aligned with the hub 52. In one embodiment, the guide 248 is formed in a tubular shape. A mass 250 is disposed within the guide 248 and connected to the pivot block 96 by a shaft 252. A spring 254 (e.g., a compression spring) is also disposed within the guide 248, and posited radially outward of the mass 250. As the wheel 12 rotates, a centrifugal force 256 acts upon the mass 250. The centrifugal force 256 increases with vehicle speed and the mass 250 compress the spring 254. As shown in FIG. 14, the pivot block 96 translates with the mass 250 to adjust the panel assembly 24 into the expanded/closed position 32. The actuator 246 may be adjusted so that the panel assembly 24 expands/closes at a predetermined speed. For example, the spring constant of the spring 254 may be selected corresponding to a predetermined vehicle speed (e.g., 70 mph).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a hub extending longitudinally inward from a wheel;
   a collar disposed over the hub and mounted for translation relative to the hub;
   a panel assembly with a support extending radially outward from the collar and first and second panels each pivotally connected to opposing lateral edges of the support for pivoting between an expanded position and a collapsed position and translating radially for selectively closing a wheel opening;
   an actuator mounted to the wheel for providing an input force in a first and a second direction;
   a translation adjustment mechanism coupled to the actuator for adjusting the collar and panel assembly longitudinally inward and outward in response to the input force; and
   a pivot adjustment mechanism coupled to the actuator for pivoting the panels between the expanded and collapsed positions in response to the input force;
   wherein the translation adjustment mechanism and the pivot adjustment mechanism are coupled to each other to collectively adjust between a closed position where the panel assembly is adjusted longitudinally outward and expanded to engage adjacent wheel spokes about the wheel opening to restrict airflow therethrough, and an open position where the panel assembly is adjusted longitudinally inward and collapsed to allow air flow through the wheel opening.

2. The vehicle of claim 1 wherein the actuator further comprises a mechanical actuator with a tube mounted radially relative to the hub and a mass mounted for translation within the tube, the mass translating radially outward when subjected to centrifugal forces for providing the input force.

3. The vehicle of claim 1 further comprising a slip ring assembly for electrically connecting the actuator to a vehicle battery.

4. The vehicle of claim 1 wherein the hub includes a peripheral surface and a recess is formed into the peripheral surface;
   wherein the collar further comprises a base with a sleeve extending over the hub, the sleeve having a pair of angled slots formed therein;
   wherein the translation adjustment mechanism further comprises first and second discs constrained within the recess for rotating about the hub in opposing directions relative to each other in response to the input force, each disc having at least one flange adapted to engage the sleeve within the angled slot for converting rotational motion of the disc to translational motion of the collar and the panel assembly.

5. The vehicle of claim 4 further comprising:
   a pivot block coupled to the actuator and coupled to each of the first and second discs;
   wherein the discs close the wheel opening in response to the input force acting in the first direction by translating the panel assembly longitudinally outward;
   wherein the discs open the wheel opening in response to an input force in a second direction by translating the panel assembly longitudinally inward.

6. The vehicle of claim 1 wherein the collar further comprises a base with a sleeve extending over the hub, and wherein the pivot adjustment mechanism further comprises:
   first and second rings disposed over the sleeve and mounted for translation with the collar, the rings also being mounted for rotation about the sleeve in opposing directions relative to each other in response to the input force; and
   a projection extending radially outward from each ring to engage one of the first and second panels for converting rotational motion of the ring to pivotal motion of the corresponding panel.

7. The vehicle of claim 6 further comprising:
   a pivot block coupled to the actuator and coupled to each of the first and second rings;
   wherein the rings close the wheel opening in response to an input force in a first direction by expanding the panels;

wherein the rings open the wheel opening in response to an input force in a second direction by collapsing the panels.

8. A system comprising:
a hub extending inward from a wheel;
a sleeve disposed over the hub;
a support extending radially outward from the sleeve with a panel pivotally connected thereto; and
a ring mounted for rotation about the sleeve in response to an input force, the ring having a projection extending radially outward therefrom for engaging the panel for converting rotational motion to pivotal motion of the panel for opening/closing a wheel opening.

9. The system of claim 8 further comprising:
the sleeve disposed over the hub with an angled slot formed therein and a panel extending radially outward therefrom; and
a disc mounted for rotation about the hub in response to an input force, the disc having a flange adapted to engage the angled slot for converting rotational motion to translational motion of the sleeve and panel for opening/closing a wheel opening.

10. The system of claim 9 further comprising:
a pin extending radially inward from the flange to engage the sleeve within the angled slot.

11. The system of claim 9 wherein the hub includes a peripheral surface and a recess is formed into the peripheral surface, and wherein the disc is longitudinally constrained within the recess.

12. The system of claim 9 wherein the angled slot is formed at an angle relative to a longitudinal axis such that the flange engages the angled slot when the disc is rotating about the hub for translating the sleeve and panel longitudinally outward when the disc is rotating in a first direction, and longitudinally inward when the disc is rotating in a second direction.

13. The system of claim 9 further comprising:
an actuator for providing the input force;
a pivot block connected to the actuator;
wherein the disc further comprises a first disc and a second disc, each disc being mounted for rotation about the hub in opposing directions relative to each other in response to an input force.

14. The system of claim 13 further comprising:
a first post extending radially outward from the flange of the first disc;
a first link pivotally connected to an inner surface of the pivot block and to the first post;
a second post extending radially outward from the flange of the second disc; and
a second link pivotally connected to the inner surface of the pivot block and to the second post;
wherein the first and second discs rotate in opposite directions in response to translation of the pivot block.

15. The system of claim 8 further comprising:
an actuator for providing the input force;
a pivot block connected to the actuator;
wherein the ring further comprises a first ring and a second ring, each ring being mounted for rotation about the sleeve in opposing directions relative to each other in response to the input force.

16. The system of claim 15 further comprising:
a first bar pivotally coupled to an outer surface of the pivot block and to an intermediate portion of the projection of the first ring; and
a second bar pivotally coupled to the outer surface of the pivot block and to an intermediate portion of the projection of the second ring;
wherein the first ring and the second ring rotate in opposite directions in response to translation of the pivot block.

17. The system of claim 16 wherein the first bar further comprises:
a ball formed at one of a first end and the outer surface of the pivot block; and
a socket formed at the other of the first end and the outer surface of the pivot block.

18. The system of claim 8 wherein the panel further comprises a first panel and a second panel each pivotally connected to opposing lateral edges of the support for pivoting between a closed position where the panels are expanded, and an open position where the panels are collapsed, and wherein the panel is angularly aligned with the wheel opening.

19. The system of claim 18 wherein the first and second panels are spring biased in the open position.

* * * * *